US007351962B2

(12) United States Patent
Kalinitchenko

(10) Patent No.: US 7,351,962 B2
(45) Date of Patent: Apr. 1, 2008

(54) ELECTRODE FOR MASS SPECTROMETRY

(75) Inventor: Iouri Kalinitchenko, Berwick (AU)

(73) Assignee: Varian Australia Pty Ltd, Mulgrave, Victoria (AU)

( * ) Notice: Subject to any disclaimer, the term of this patent is extended or adjusted under 35 U.S.C. 154(b) by 217 days.

(21) Appl. No.: 10/574,569

(22) PCT Filed: Oct. 6, 2004

(86) PCT No.: PCT/AU2004/001357

§ 371 (c)(1),
(2), (4) Date: Apr. 4, 2006

(87) PCT Pub. No.: WO2005/034169

PCT Pub. Date: Apr. 14, 2005

(65) Prior Publication Data

US 2007/0063137 A1 Mar. 22, 2007

(30) Foreign Application Priority Data

Oct. 8, 2003 (AU) .............................. 2003905485

(51) Int. Cl.
*B01D 59/44* (2006.01)

(52) U.S. Cl. ....................................... 250/292; 250/281

(58) Field of Classification Search ................ 250/281, 250/293, 292; 29/746; 96/49
See application file for complete search history.

(56) References Cited

U.S. PATENT DOCUMENTS 3,793,063 A * 2/1974 Wiley ...................... 204/192.1
5,616,919 A * 4/1997 Broadbent et al. .......... 250/292
7,208,729 B2 * 4/2007 Syms ......................... 250/288

FOREIGN PATENT DOCUMENTS

GB 2 099 216 A 12/1982

OTHER PUBLICATIONS

Product description for ELAN DRC-e ICP-MS by Perkin-Elmer SCIEX, introduced in 2003 as per applicant's IDS.*
Product description for Elan 9000 found on Perkin Elmer website at : http://las.perkinelmer.com/Catalog/ProductInfoPage.htm?ProductID=N8120536.

* cited by examiner

*Primary Examiner*—Jack I. Berman
*Assistant Examiner*—Michael Maskell
(74) *Attorney, Agent, or Firm*—Bella Fishman

(57) ABSTRACT

An electrode for use in a reduced pressure region in a mass spectrometer whereby the electrode is subject to deposition of dielectric (non-conducting) substances thereon, which can cause unstable performance of the mass spectrometer. The surface portion of the electrode that is for providing an equipotential boundary of an electric field for influencing charged particles is made rough, in contrast to the prior art of providing a polished surface. The rough surface provides projections and cavities, which may have a regular or irregular occurrence, which it has been found significantly reduces the deposition of dielectric substances from the charged particles thereon. A preferred structure is for a rod electrode (42) to have a screw thread (44) formed thereon whereby the thread crests (43) along the rod electrode provide projections (43) and the thread roots (45) provide cavities.

5 Claims, 5 Drawing Sheets

ELECTRODE FOR MASS SPECTROMETRY

TECHNICAL FIELD

The present invention relates to an electrode for use in a region of a mass spectrometer where the electrode is subject to deposition of dielectric substances thereon. Generally the region of the mass spectrometer will be a reduced pressure region. The electrode may be part of a mass analyser, ion optics system or ion guide, ion detector or source to spectrometer interface in a mass spectrometer, the mass spectrometer being used in conjunction with, for example, an inductively coupled plasma, microwave induced plasma, liquid chromatograph, gas chromatograph or laser ablation.

BACKGROUND

The following discussion of the background to the invention is included to explain the context of the invention. This is not to be taken as an admission that any of the material referred to was published, known or part of the common general knowledge in the art as at the priority date established by the present application.

Electrodes within a reduced pressure region of a mass spectrometer which provide electric fields for forming or containing and propagating an ion beam, or for controlling the properties of an ion beam, or for mass filtration of ions, or for affecting other aspects of an ion beam relevant to the stable operation of a mass spectrometer, usually have polished surfaces for providing an equipotential boundary for an electric field. However such electrodes are subject to deposition of non-conducting (dielectric) substances thereon. Such dielectric deposits, which generally form a film, can arise from several sources including contaminants and chemically active species in ion beams representative of the composition of analytical samples presented to the mass spectrometer for analysis. Thus an ion beam that passes through a mass spectrometer can include chemically active particles that can cause deposition of a dielectric film when they strike an electrode. The dielectric film can then cause build-up of electric charge on the surface of the electrode when charged particles contact the film. This surface charge causes unstable performance of the mass spectrometer. Sometimes a chemically reactive residual gas present in the vacuum system of a mass spectrometer can initiate the film deposition process when the gas comes into contact with the surfaces of electrodes in the vacuum system. For example residual oil vapour (hydrocarbons) from vacuum pumps can initiate the growth of dielectric films on the surfaces of electrodes. The rate of accumulation of such films can be increased greatly when the deposition process is supplemented by ion and/or electron and/or photon bombardment of the affected surfaces. Such conditions are present in many mass spectrometers and are believed to be responsible for the deposition of dielectric films that very often can be found, for example, on the ion optics and on the fringe rods of a quadrupole mass analyser in an inductively coupled plasma mass spectrometer. Residual oil vapour accompanied by ion bombardment can produce hydrocarbon-based dielectric or semi-dielectric films on these components. These dielectric films can be highly detrimental to the stability of the instrument's performance.

An object of the present invention is to provide an electrode for use in a region of a mass spectrometer in which the likelihood of deposition of dielectric substances onto the electrode is reduced.

DISCLOSURE OF THE INVENTION

According to the invention there is provided an electrode for use in a region of a mass spectrometer where the electrode is subject to deposition of dielectric substances thereon, the electrode having a surface portion for providing an equipotential boundary of an electric field for influencing charged particles, wherein the surface portion is relatively rough to provide projections and cavities for reducing deposition of dielectric substances onto the surface portion.

It has been found that deposition of a dielectric film is less likely to occur when the surface portion of the electrode that defines an equipotential boundary for an electric field is not polished as for prior art electrodes, but instead is made rough by inclusion or projections and cavities.

Preferably the projections have a shape or shapes such that they reduce in size outwardly of the surface portion whereby they have at least one sloped side surface for providing an increased probability that the charged particles will strike such side surfaces at an angle thereto. It is considered that this feature assists to reduce deposition of dielectric substances on the projections, as will be explained below.

The projections and cavities that provide the roughness of the surface portion of the electrode may have a periodical or regular occurrence and may be provided by, for example, cuts, threads, channels, holes or similar in the surface portion. Alternatively the projections and cavities may have a non-periodical or irregular occurrence and may be provided by, for example, sandblasting, stoning or scratching treatments of the surface portion.

According to the invention, the "degree of roughness" of the surface may be quite pronounced, for example a distance of approximately 0.5 mm from the peak of a projection to the base of a cavity has provided significantly improved results compared to a prior art polished surface electrode.

Preferably the surface portion in question of an electrode according to the invention is provided with a helical formation such as a screw thread to provide the roughness.

The invention extends to the provision of a mass spectrometer, or a component thereof such as for example an ion guide or mass filter, which includes an electrode according to the invention.

For a better understanding of the invention and to show how the same may be put into effect, several embodiments thereof will now be described, by way of non-limiting example only, with reference to the accompanying drawings.

BRIEF DESCRIPTION OF DRAWINGS

FIG. 5A is a cross-section view of FIG. 5B.

FIG. 6A is a longitudinal section showing a half of the rod and FIG. 6B is a cross section view of FIG. 6A.

DETAILED DESCRIPTION OF EMBODIMENTS

It is known that dielectric film when deposited on electrodes in a vacuum system of a mass spectrometer can cause build-up of electrical charges on the affected surfaces. This causes changes in the electrical fields around the electrode causing changes in the performance characteristics of the mass spectrometer. The present invention is based on the observation that film deposition is less likely to happen when the surface is not polished, but is rough. It is believed that when an electrode surface exposed to a flux of potentially contaminating particles consists of a combination of cavities and projections (which may be micro-cavities and micro-pinnacles), then that surface is in a favourable condition for dispersing initial deposits of contaminating film around the projections in such a way that at least the projections tend to stay relatively clean. As long as the projections are relatively clean, the electric field around the electrode remains stable and causes no change in performance of the mass spectrometer.

Figure 1A:
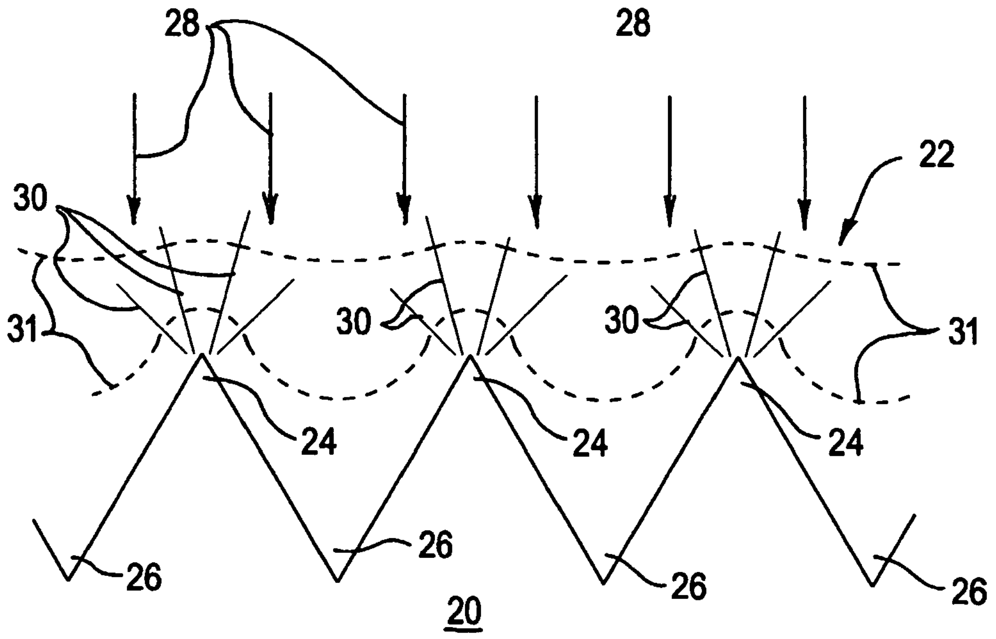
FIGS. 1A and 1B are diagrammatic illustrations to assist a possible explanation of the observation upon which the invention is based (that is, how a relatively rough electrode surface in a vacuum system of a mass spectrometer is less likely to have a dielectric film deposited on it compared to a polished electrode surface).
Figure 1B:
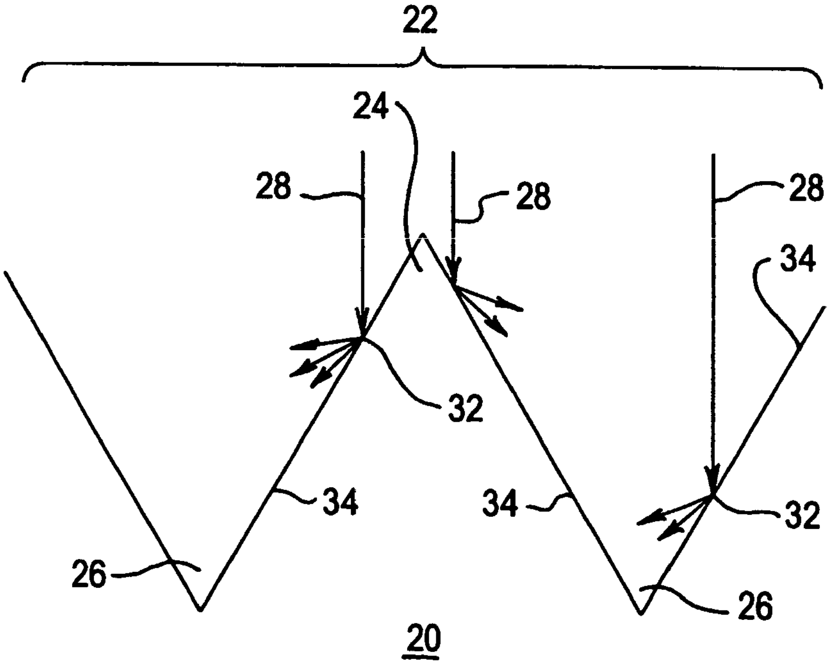

FIGS. 1A and 1B illustrate a surface portion 22 of an electrode 20 for use in a reduced pressure region in a mass spectrometer. The surface portion 22 is rough thereby providing projections 24 and cavities 26. The projections 24 and cavities 26 of surface 22 provide multiple conditions it is believed that help to disperse a contaminating film build-up. These conditions include, surface electrostatic field gradient, surface molecular diffusion, localised electron emission (including secondary electron emission), angle of impact of the primary contaminant flux onto the projections 24 ("flushing" effect), and ion impact density gradient onto the projections 24. All of these phenomena help to keep the projections 24 of the electrode surface 22 cleaner and therefore in working condition. FIGS. 1A and 1B illustrate a flux 28 of potentially contaminating ions approaching the rough surface 22 of the electrode 20. The electric field produced in proximity to the rough surface 22 is not uniform, as indicated by field lines 30, but rather is distorted having electric field density gradients (compare the equipotential dashed lines 31). The projections 24 have a higher density electric field. This field may change the ion impact trajectory and/or energy near the projections 24. The projections 24 may produce excessive electron emission as the result of ion impact and excessive electric field, thus helping to desorb particles from the surface by Electron Stimulated Desorption. This would help to keep the surface 22 of the electrode 20 cleaner than the surface would be without having the projections 24 and cavities 26, that is, if the surface were polished. The projections 24 have a shape such that they reduce in size outwardly of the surface portion 22 whereby they have sloped side surfaces 34, as shown in FIG. 1B. When energetic ions 28 impact at 32 onto a sloped or angular surface 34 of a projection 24, this produces a "flushing" effect along the surface 34 down to the cavity 26, helping to keep the projection 24 cleaner. This flushing effect could be enhanced by molecular diffusion of contaminants on the surface under the influence of the surface electric field gradient associated with the projections 24-cavities 26 resulting from the angled impact of primary contaminant ions and working electrode voltages. It is considered that the sloped side surfaces 34 of the projections 24 provide an increased probability that charged particles in the ion flux 28 will strike the sloped side surfaces 34 at an angle, as shown in FIG. 1B, thus assisting to reduce deposition of dielectric substances on the projections 24 via a flushing effect as described above.

Figure 2A:
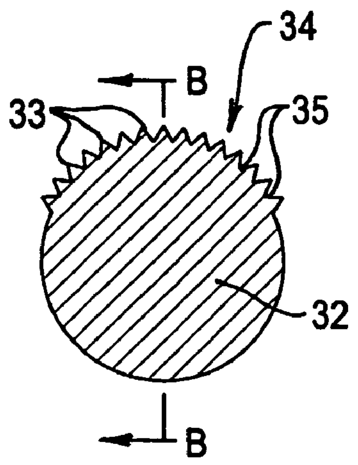
FIGS. 2A and 2B schematically illustrate cross sections of a cylindrical electrode (that is, a rod electrode), according to an embodiment of the invention.
Figure 2B:
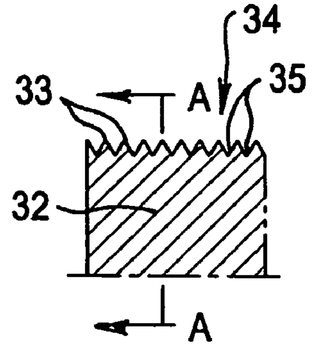
Figure 3:
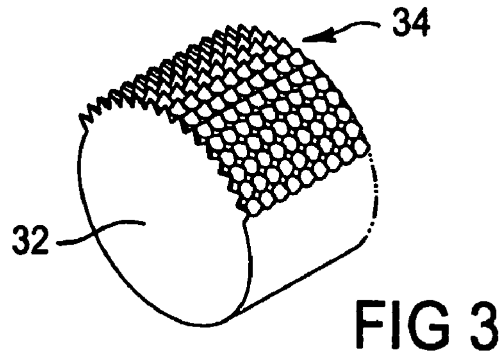
FIG. 3 is a schematic perspective view of an electrode as in FIGS. 2A and 2B.
Figure 4:
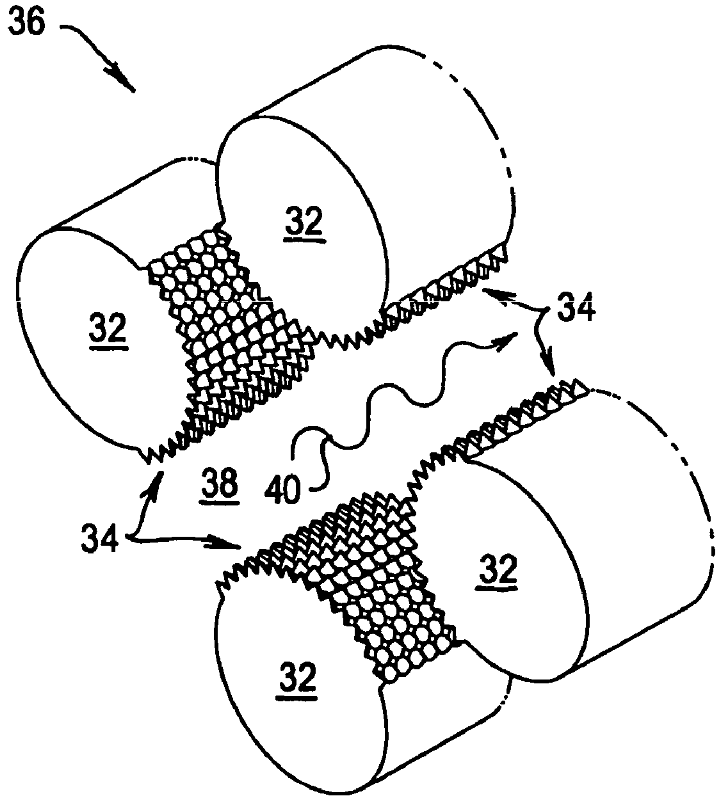
FIG. 4 schematically illustrates four round rod electrodes, each according to an embodiment of the invention, arranged in a quadrupole mass filter configuration.

FIGS. 2A, 2B and FIG. 3 illustrate a round electrode 32 having a relatively rough surface portion 34 including projections 33 and cavities 35. FIGS. 2A and 2B show, respectively, a portion of a transverse cross-section (on section line AA of FIG. 2B) and a longitudinal cross-section (on section line BB of FIG. 2A) of the rod electrode 32. FIG. 4 shows a quadrupole ion guide 36 made up of four of the rods 32 wherein the relatively rough surface portions 34 face a volume 38 between the electrodes 32 where ions 40 mainly exist and from which contaminants may come.

Figure 5A:
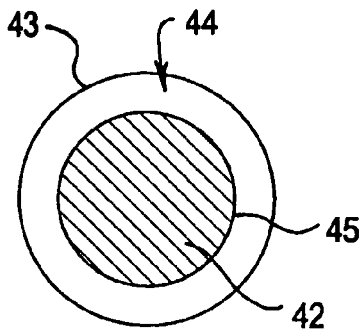
FIGS. 5A and 5B schematically illustrate a preferred embodiment of the invention, which is a threaded round rod electrode.
Figure 5B:
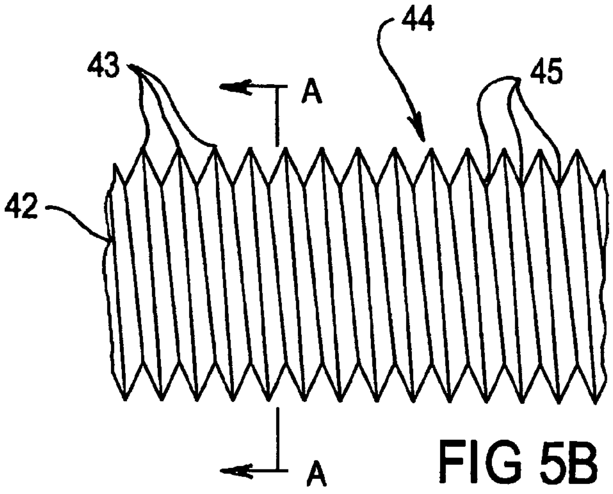

FIGS. 5A and 5B show a preferred embodiment of the invention, which involves a relatively simple way of providing a controlled rough surface on a rod electrode 42, namely by cutting a helical screw thread 44 around the rod electrode 42. FIG. 5A is a transverse cross-section of the rod 42 on section line AA of FIG. 5B. Thus the rod electrode 42 includes projections 43 (the crests of the thread 44) and cavities 45 (the roots of the thread 44). The inherent simplicity of this way of providing a rough surface and the well controlled mechanical tolerances that are possible with the cutting of screw threads makes this a preferred way of providing a periodically rough surface.

The resulting electrode structure of FIGS. 5A and 5B has been applied to a set of quadrupole fringe electrodes of the kind disclosed without threads in International application No. PCT/AU01/01024 (WO 01/91159 A1). Each of the four electrodes in the set was 9 mm in diameter. Threads were cut over a 12 mm length at the end of each electrode that faced the incoming ions. The threads were of 0.5 mm pitch; the cross-section of each thread approximated an equilateral triangle, so the angle at the apex was 60 degrees. The apices of the threads were made as sharp as the machining process would permit. The electrodes were assembled as described in PCT/AU01/01024 for use in a quadrupole mass analyser in an inductively coupled plasma mass spectrometer. Previously, a similar set of electrodes without threads had been used in the same instrument. After the threaded electrodes were installed the instrument's analytical performance showed improved stability compared to that observed when the electrodes were not threaded. The unthreaded electrodes were associated with a gradual loss of analytical signal that could be restored temporarily by application of a negative DC potential to the electrode assembly in addition to the normal radio frequency voltage. Eventually the electrode assembly had to be removed and each electrode vigorously cleaned to remove deposited dielectric films. With the threaded rods there was no need to apply a negative DC potential to the set of electrodes and when such a potential was applied, it had no effect on the analytical signal. This indicates that the set of electrodes was having its intended effect of introducing the ions into the mass filtering section of the quadrupole mass analyser, without disturbances associated with the accumulation and charging of dielectric films. Furthermore, the threaded rods did not require cleaning despite the instrument having been operated for a period of time at least 15 times as long as that over which the unthreaded rods had been in use before they had to be cleaned.

Figure 14A:
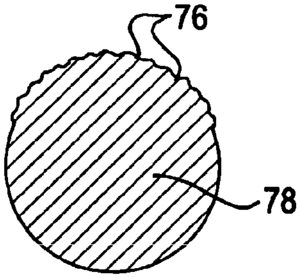
FIGS. 7 to 14 schematically illustrate rough surface portions of electrodes according to embodiments of the invention, wherein the roughness is provided by various periodical and non-periodical structures.
Figure 14B:
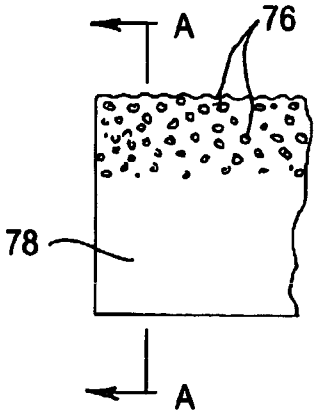
Figure 6A:
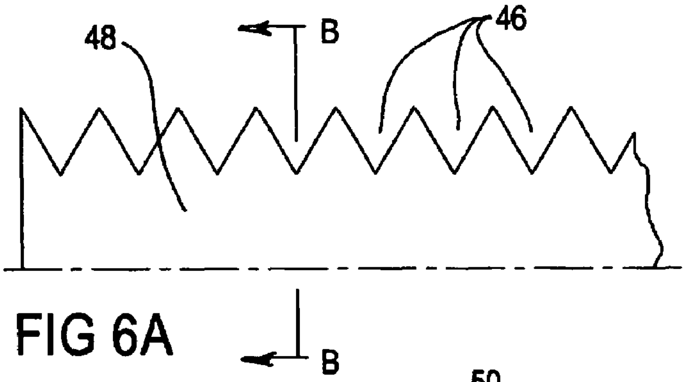
FIGS. 6A and 6B schematically illustrate a periodical structure for a round rod electrode which may provide the rough surface.
Figure 6B:
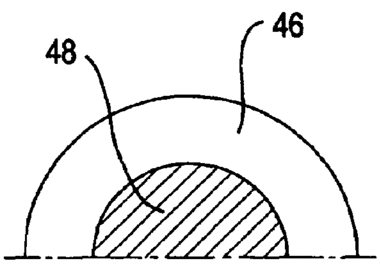
Figure 7:
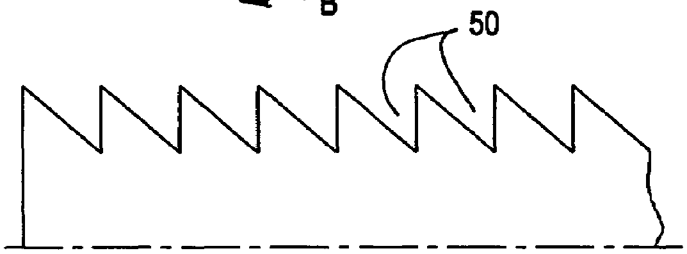
Figure 8:
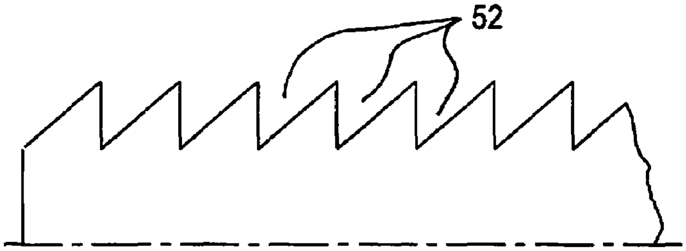
Figure 9:
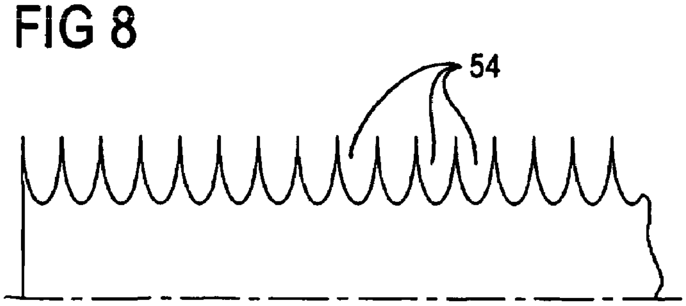
Figure 10:
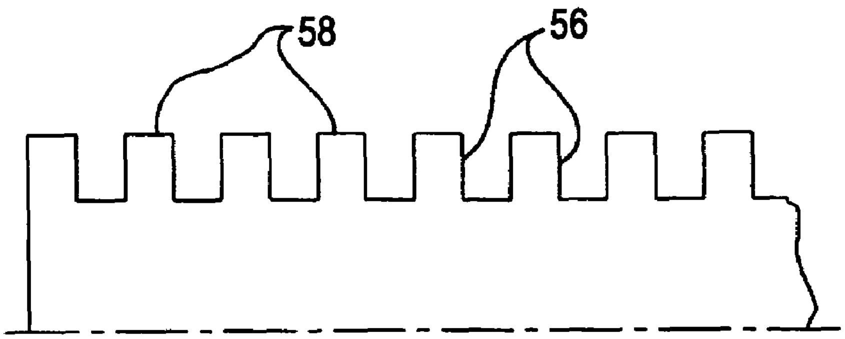
Figure 11:
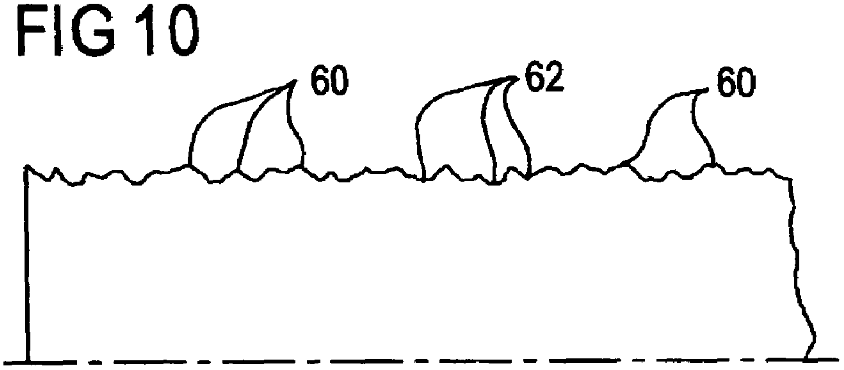
Figure 12:
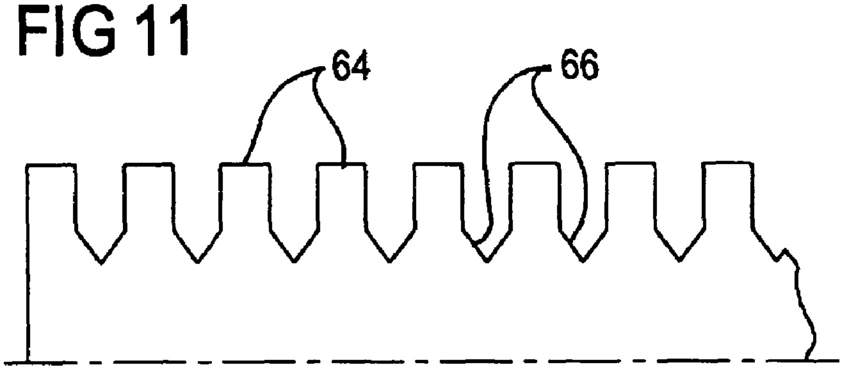
Figure 13:
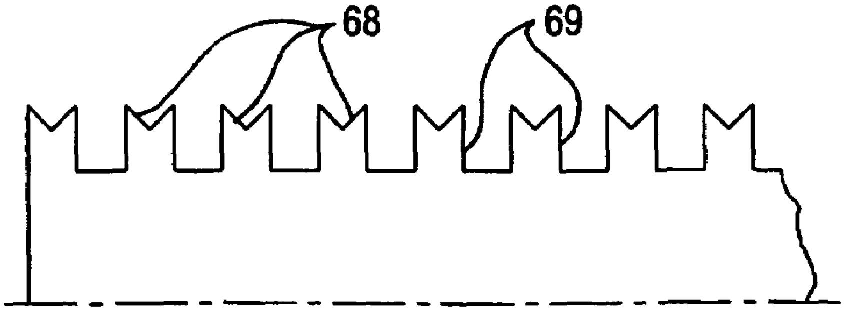

Other possible structures for providing a rough surface portion on an electrode in accordance with the invention include the provision of circumferential channels such as channels 46 in a rod electrode 48 (see FIGS. 6A and 6B. FIG. 6B is a cross section on section line BB of FIG. 6A). Such channels could be cut to provide different shapes, such as saw-toothed 50 and 52 (see FIGS. 7 and 8) or scalloped 54 (see FIG. 9). Projections 56 having a flat top 58 (see FIG. 10), or randomly provided projections 60 and cavities 62 (see FIG. 11), or projections 64 with shaped cavities 66 therebetween (see FIG. 12), or specially shaped tops 68 of projections 69 (see FIG. 13) are also expected to deliver anti-contamination performance given the performance of the FIGS. 5A and 5B embodiment. The figures demonstrate that surface irregularities of any shape should create conditions favourable to preventing the accumulation of dielectric film. FIG. 11 illustrates a relatively rough surface that can be inexpensively produced by means of sand blasting, stone rumbling or by any other mechanical process that provides a randomly roughened surface. It is also possible to produce the desired anti-dielectric deposition effect by making a relatively rough surface by means of laser or any other non-mechanical influence that can produce cavities or holes 76 (or otherwise create a pitted surface) on the electrode 78 surface (see FIG. 14) leaving "projections" therebetween.

Electrodes having a rough surface portion according to the invention, regardless of how that surface is produced, when in a mass spectrometer, will have a greater ability than prior art polished electrodes to resist the accumulation of dielectric film and will therefore provide more stable electrical characteristics in the presence of potentially contaminating substances. Such electrodes in mass spectrometers (such as inductively coupled plasma mass spectrometers) provide more stable and reproducible electrical fields when operated under conditions that would otherwise favour contamination (bad vacuum, presence of hydrocarbons from pump oil, aggressive samples). This provides better mass spectrometer detection limits, improved stability, less signal drift, and reduced maintenance.

An additional advantage of the invention is that the electrode surfaces of an ion guide or mass filter can be made sufficiently rough that photons or energetic particles can be reflected at an angle greater than the incidence angle and are thereby diffused away from an ion detector. Thus, making the surface of the electrodes rough instead of providing the conventional highly polished surface reduces the reflection of energetic neutral particles or photons into a detector and provides greater diffuse scattering of energetic neutrals and photons away from the detector, thereby reducing the continuous background without loss of analytical sensitivity, and consequently improving analytical detection limits.

The invention is applicable not only to the fringe rods of a quadrupole mass analyser but to many types of multipole ion guides, multipole mass analyzers and to known rod shapes including hyperbolic rods. It is also applicable to known charged particle electrodes including ion optics, detectors and source-interface electrodes. Rough surfaces on the ion optical elements, interface and detector parts prevent accumulation of dielectric films and therefore provide more stable and reproducible instrument performance and reduced maintenance.

The invention described herein is susceptible to variations, modifications and/or additions other than those specifically described and it is to be understood that the invention includes all such variations, modifications and/or additions which fall within the scope of the following claims.

What is claimed is:

1. A rod electrode for use in a region of a mass spectrometer where the electrode is subject to deposition of dielectric substances thereon, the electrode having a surface portion for providing an equipotential boundary of an electric field for influencing charged particles, wherein the surface portion is relatively rough to provide projections and cavities for reducing deposition of dielectric substances onto the surface portion.

2. The rod electrode as claimed in claim 1 wherein the projections have a shape or shapes such that they reduce in size outwardly of the surface portion whereby they have at least one sloped side surface for providing an increased probability that the charged particles will strike such side surface at an angle thereto.

3. The rod electrode as claimed in claim 1, wherein the projections and cavities have a periodical or regular occurrence over the surface portion.

4. The rod electrode as claimed in claim 1, wherein the surface portion of the rod is screw-threaded, whereby thread crests along the rod provide the projections and thread roots along the rod provide the cavities.

5. The rod electrode as claimed in claim 1, wherein the projections and cavities have a non-periodical or irregular occurrence over the surface portion.

* * * * *